US 8,869,519 B2

(12) United States Patent
Sugiyama (10) Patent No.: US 8,869,519 B2
(45) Date of Patent: Oct. 28, 2014

(54) HYBRID-TYPE SHOVEL (75) Inventor: Yuta Sugiyama, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 622 days.

(21) Appl. No.: 13/201,259

(22) PCT Filed: Feb. 17, 2010

(86) PCT No.: PCT/JP2010/052334
§ 371 (c)(1),
(2), (4) Date: Aug. 12, 2011

(87) PCT Pub. No.: WO2010/095639
PCT Pub. Date: Aug. 26, 2010

(65) Prior Publication Data
US 2011/0289907 A1 Dec. 1, 2011

(30) Foreign Application Priority Data

Feb. 18, 2009 (JP) ................................ 2009-035780

(51) Int. Cl.
| F16D 31/02 | (2006.01) |
| F16D 31/00 | (2006.01) |
| E02F 9/20 | (2006.01) |
| B60L 11/18 | (2006.01) |
| B60W 10/08 | (2006.01) |
| B60K 6/46 | (2007.10) |
| B60L 11/02 | (2006.01) |
| F02D 29/06 | (2006.01) |
| H02P 23/14 | (2006.01) |
| E02F 9/22 | (2006.01) |
| B60W 20/00 | (2006.01) |

(52) U.S. Cl.
CPC ......... *E02F 9/2025* (2013.01); *B60Y 2200/412* (2013.01); *E02F 9/2075* (2013.01); *B60W 2710/0666* (2013.01); *B60L 11/18* (2013.01);
*Y02T 10/642* (2013.01); *B60W 10/08* (2013.01); *B60W 20/00* (2013.01); *Y02T 10/7005* (2013.01); *B60K 6/46* (2013.01); *Y02T 10/7077* (2013.01); *B60L 11/02* (2013.01); *F02D 29/06* (2013.01); *H02P 23/14* (2013.01); *Y02T 10/6217* (2013.01); *E02F 9/2217* (2013.01)
USPC .................................. 60/414; 60/325; 60/328

(58) Field of Classification Search
USPC ............................................ 60/414, 325, 328
See application file for complete search history.

(56) References Cited

U.S. PATENT DOCUMENTS

| 5,650,706 A * | 7/1997 | Yamada et al. ............... 318/701 |
| 6,573,745 B2 * | 6/2003 | Raftari et al. ............ 324/765.01 |

(Continued)

FOREIGN PATENT DOCUMENTS

| JP | 10-103112 | 4/1998 |
| JP | 2004-007924 | 1/2004 |
| JP | 2005-127344 | 5/2005 |

OTHER PUBLICATIONS

International Search Report mailed on May 25, 2010.

*Primary Examiner* — Edward Look
*Assistant Examiner* — Daniel Collins
(74) *Attorney, Agent, or Firm* — IPUSA, PLLC (57) ABSTRACT

An electric power accumulating means (30) includes a DC bus connected to an electric power accumulator (19) and supplies a direct current, a smoothing capacitor provided to the DC bus, and a voltage detector (23) that detects a voltage of the DC bus. The generator (12) generates an induced voltage E by being rotationally driven by an engine (11) when starting the engine (11). Degaussing of a permanent magnet of the generator is determined by performing a comparison between the induced voltage E detected by the voltage detector (23) and a previously set reference induced voltage RE.

7 Claims, 8 Drawing Sheets

(56) References Cited

U.S. PATENT DOCUMENTS

| | | | |
|---|---|---|---|
| 7,023,171 B2* | 4/2006 | Su et al. | 318/400.26 |
| 7,086,226 B2* | 8/2006 | Oguri | 60/414 |
| 7,425,183 B2* | 9/2008 | Kelley, Jr. | 475/204 |
| 2007/0090650 A1* | 4/2007 | Komiyama et al. | 290/40 C |
| 2010/0097037 A1* | 4/2010 | Morinaga et al. | 322/14 |

* cited by examiner

HYBRID-TYPE SHOVEL

TECHNICAL FIELD

The present invention relates to a hybrid-type shovel and, more particularly, to a hybrid-type shovel in which a generator assists an engine.

BACKGROUND ART

In a hybrid-type shovel such as a hybrid-type hydraulic shovel, it is usual to assist an engine by driving an electric motor, which is referred to as an assist motor, by an electric power supplied from a battery (for example, refer to Patent Document 1). A permanent magnet motor, such as an IPM (Interior Permanent Magnet) motor, is used as an assist motor in many cases.

In the IPM motor, a rotor having a permanent magnet embedded therein is arranged inside a stator provided with coils. By supplying an electric current to the coils of the stator to generate a rotating magnetic field, the rotor is rotated by an action between the rotating magnetic field and a magnetic field generated by the permanent magnet of the rotor. Accordingly, the rotating force of the rotor, that is, an output of the IPM motor, is proportional to the magnetic field generated by the permanent magnet embedded in the rotor.

Although the permanent magnet embedded in the rotor is a strong magnet, the magnetic force may be reduced (degaussed) if it becomes a high-temperature, and the magnetic force may be attenuated gradually due to aging. If the magnetic force of the permanent magnet embedded in the rotor is reduced, the output of the IPM motor is reduced.

PRIOR ART DOCUMENT

Patent Document

PATENT DOCUMENT 1: Japanese Laid-Open Patent Application No. 10-103112

SUMMARY OF THE INVENTION

Problems to be Solved by the Invention

The present invention was made in view of the above-mentioned problem, and it is an object of the present invention to provide a hybrid-type shovel which can detect degaussing of a permanent magnet in an assist motor or other electric motors with a simple structure and operation.

Means to Solve the Problem

There is provided according to the present invention a hybrid-type shovel including: an engine; a hydraulic pump driven by an output of the engine; a boom drive hydraulic cylinder and an arm drive hydraulic cylinder that are driven by hydraulic pressure supplied from the hydraulic pump; a generator coupled to the engine and generating electric power by revolution of the engine; an electric power accumulating means that supplies electric power to the generator; and a turning motor connected to the electric power accumulating means via an inverter to drive a turning mechanism, wherein the electric power accumulating means includes a DC bus connected to an electric power accumulator and supplies a direct current, a smoothing capacitor provided to the DC bus, and a voltage detector that detects a voltage of the DC bus; the generator generates an induced voltage by being rotationally driven by the engine when starting said engine; and degaussing of a permanent magnet of the generator is determined by performing a comparison between the induced voltage detected by the voltage detector and a previously set reference induced voltage.

In the above-mentioned hybrid-type shovel it is preferable that the voltage detector is attached to the DC bus. Additionally, it is preferable that, when detecting the induced voltage of the generator to perform the comparison, braking is applied mechanically to the turning drive part to be maintained in a stopped state. Further, it is preferable that, when detecting the induced voltage of the generator to perform the comparison at a start time of the engine, the DC bus and the electric power accumulator are set in a non-connected state.

Additionally, it is preferable that the generator is mechanically coupled to the engine. Alternatively, the generator may be driven by a boom regenerative hydraulic motor. In this case, it is preferable that a bypass circuit that connects said hydraulic pump and said boom regenerative hydraulic motor is provided.

Effect of the Invention

According to the present invention, degaussing of the permanent magnet of the motor generator, which assists the engine, or other electric motors can be detected easily with a simple structure merely added with a voltage detector which detects a voltage of the DC bus.

DETAILED DESCRIPTION OF THE PREFERRED EMBODIMENTS

A description will be given below, with reference to the drawings, of embodiments of the present invention.

First, a description is given of a hybrid-type shovel to which the present invention is applied.

Figure 1:
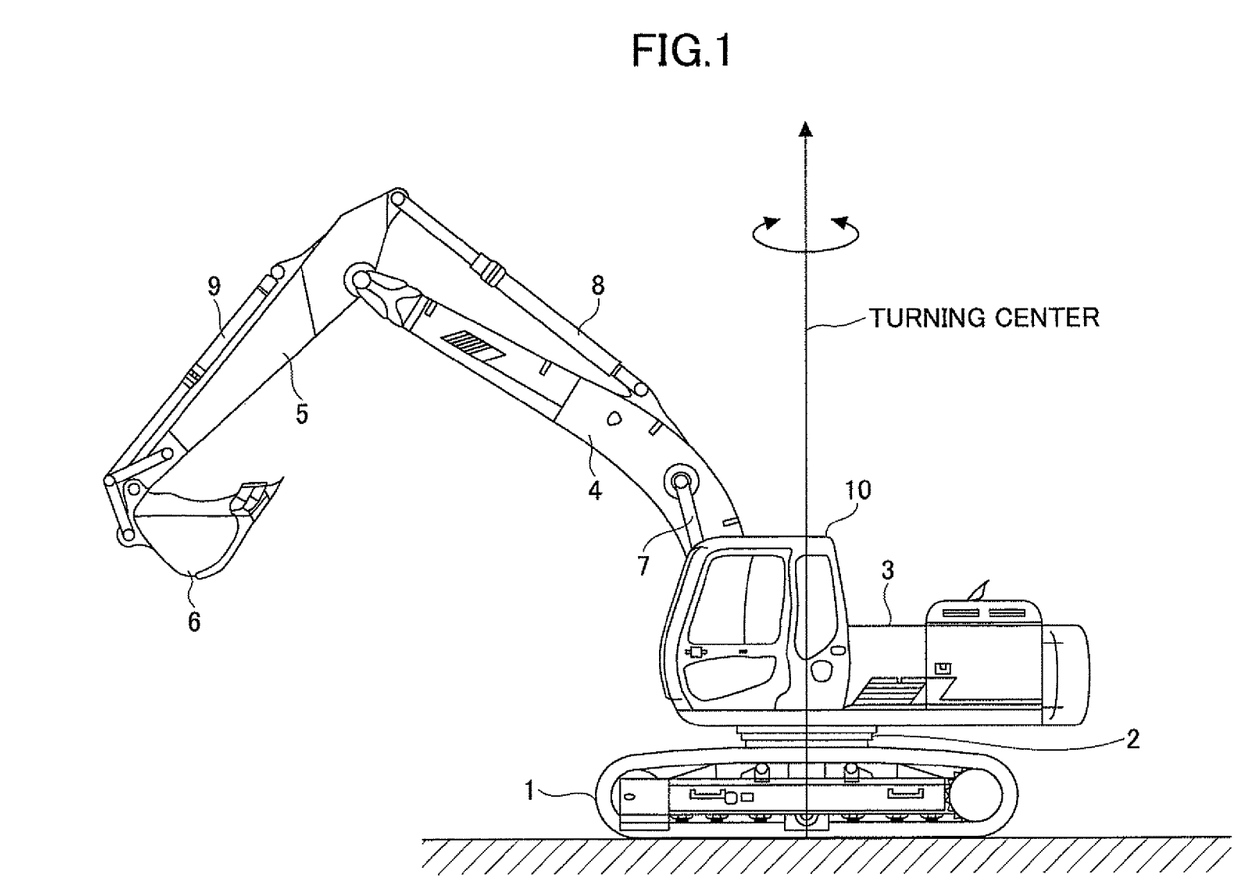
FIG. 1 is a side view of a hybrid-type shovel.

FIG. 1 is a side view of a hybrid-type shovel. An upper-part turning body 3 is mounted on a lower-part running body 1 via a turning mechanism 2. A boom 4 extends from the upper-part turning body 3, and an arm 5 is connected to an end of the boom 4. Further, a bucket 6 is connected to an end of the arm 5. The boom 4, the arm 5 and the bucket 6 are hydraulically driven by a boom cylinder 7, an arm cylinder 8 and a bucket cylinder 9, respectively. Moreover, a cabin 10 and a power source (not illustrated in the figure) are mounted on the upper-part turning body 3.

Figure 2:
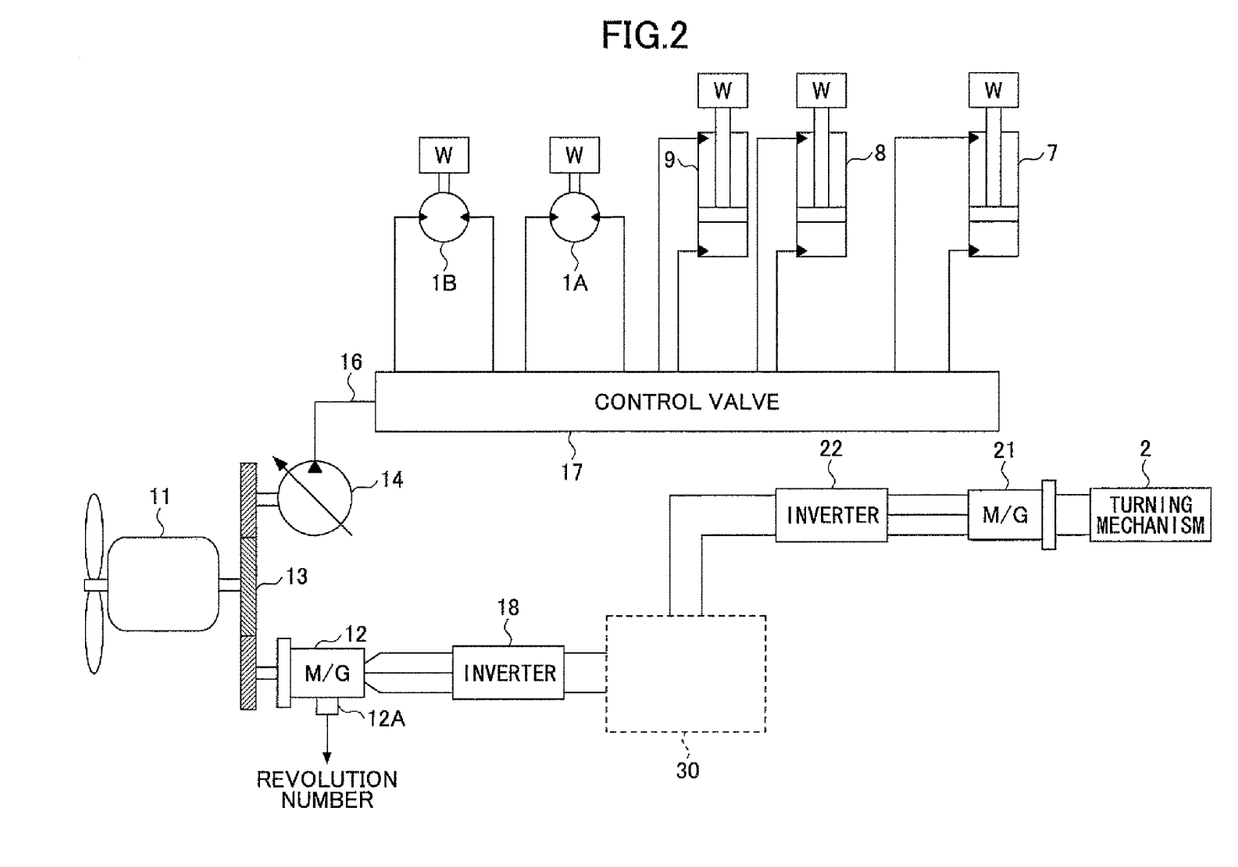
FIG. 2 is a block diagram representing a structure of a drive system of the hybrid-type shovel.

FIG. 2 is a block diagram illustrating a structure of the hybrid-type shovel illustrated in FIG. 1.

Both an engine 11 as a mechanical drive part and a motor generator 12 as an assist drive part are connected to an input axis of a transmission machine 13 as a power increasing machine. A hydraulic pump 14 is connected to an output axis of the transmission machine 13. A control valve 17 is connected to the hydraulic pump 14 through a high-pressure hydraulic line 16.

The control valve 17 is a control device which controls a hydraulic system. The control valve 17 is connected with hydraulic motors 1A (for right) and 1B (for left) for the lower-part running body 1, the boom cylinder 7, the arm cylinder 8, and the bucket cylinder 9 through high-pressure hydraulic lines.

An electric power accumulating means 30 including an electric power accumulator 19 and a converter 20 is connected to the motor generator 12 through an inverter 18. A turning motor generator 21 is connected to the electric power accumulating means 30 through an inverter 23. The turning motor generator 21 is an electric load in the hybrid-type shovel, which can serve as a motor for turning the upper-part turning body 3 by driving the turning mechanism 22 and also serve as a generator for generating a regenerative electric power.

The hybrid-type shovel having the above-mentioned structure is a hybrid-type shovel having the engine 11, the motor generator 12 and the turning motor generator 21 serving as power sources. A description will be given below of each part.

The engine 11 is, for example, an internal combustion engine, which is constituted by a diesel engine, and an output axis thereof is connected to one of input axes of the transmission machine 13. The engine 11 is always operated during operation of the shovel.

The motor generator 12 can be any electric motor which is capable of performing both a power running operation and a generating operation. That is, the motor generator 12 is a combination of a generator and a motor. Here, a motor generator driven by an inverter 18 is indicated as the motor generator 12. The motor generator 12 is a permanent magnet motor, and can be constituted by, for example, an IPM (Interior Permanent Magnet) motor having a magnet embedded in an interior of a rotor. The rotation axis of the motor generator 12 is connected to the other of the input axes of the transmission machine 13. The motor generator 12 is provided with a temperature sensor 12A so that a revolution number of the motor generator 12 can be detected.

The transmission machine 13 has two input axes and one output axis. A drive axis of the engine 11 and a drive axis of the motor generator 12 are connected to the two input axes, respectively. A drive axis of the hydraulic pump 14 is connected to the output axis. Switching between the power running operation and the generating operation of the motor generator 12 is performed by a controller in accordance with a load to the engine 11 and the like.

The hydraulic pump 14 is a hydraulic pump which can generate a hydraulic pressure to be supplied to the control valve 17. The hydraulic pressure generated by the hydraulic pump 14 is supplied to drive each of the hydraulic motors 1A and 1B, the boom cylinder 7, the arm cylinder 8, and the bucket cylinder 9.

The control valve 17 is a hydraulic control device to perform a hydraulic drive control by controlling a hydraulic pressure supplied to each of the hydraulic motors 1A and 1B for lower-part running body 1, the boom cylinder 7, the arm cylinder 8, and the bucket cylinder 9 connected through the high-pressure hydraulic lines according to an operation input of an operator.

The inverter 18 is provided between the motor generator 12 and the electric power accumulating means 30 to perform an operation control of the motor generator 12 based on instructions from the controller. Thereby, when the inverter 18 controls the motor generator 12 to perform a power running operation, the inverter 18 supplies a necessary electric power to the motor generator 12 from the electric power accumulating means 30. On the other hand, when controlling the motor generator 12 to perform a generating operation, the inverter 18 supplies electric power generated by the motor generator 12 to the electric power accumulating means 30.

Figure 3:
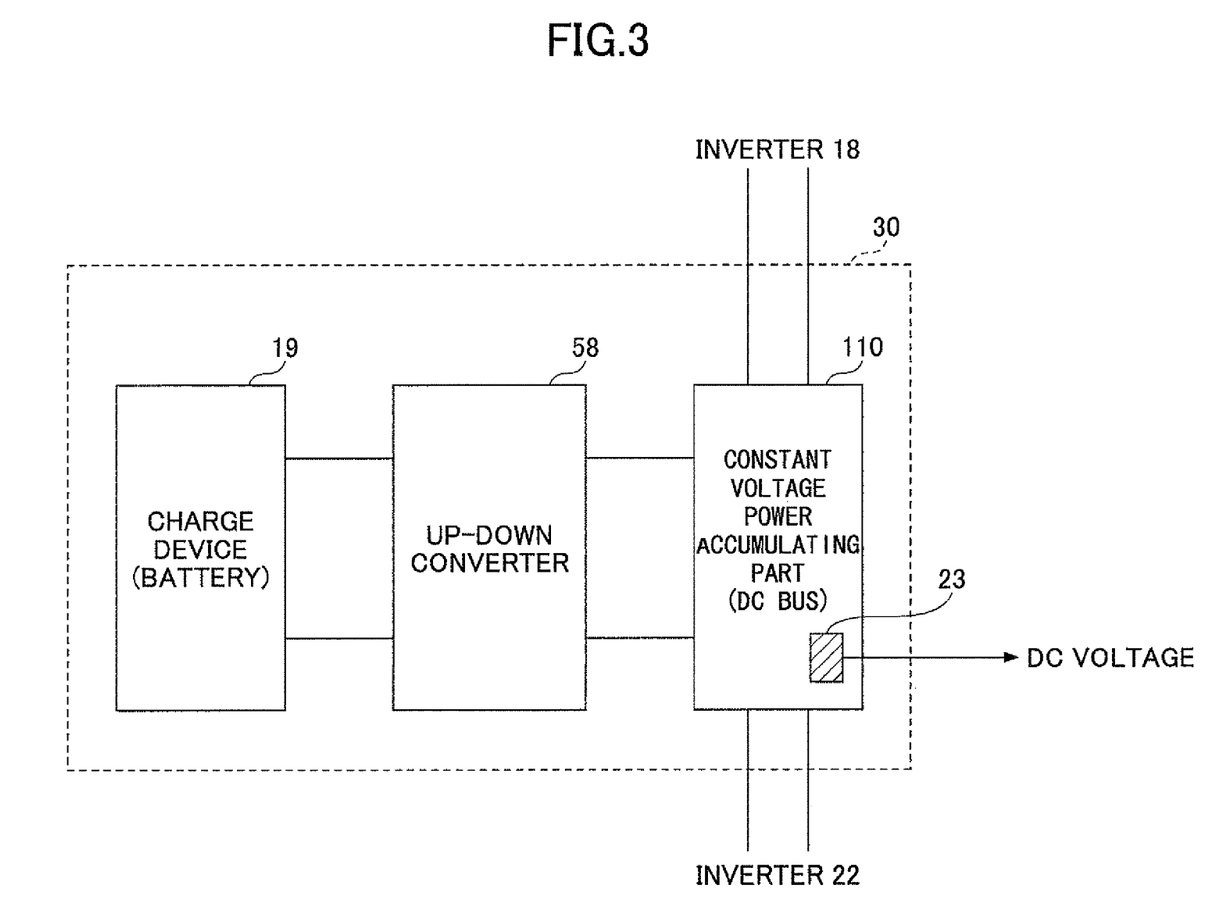
FIG. 3 is a block diagram indicating a structure of an electric power accumulating means.

FIG. 3 is a block diagram illustrating a structure of the electric power accumulating means 30. The electric power accumulating means 30 has an electric power accumulator 19 as a variable voltage power accumulating part. In the present embodiment, a capacitor (electric double layer capacitor) is used as the electric power accumulator, however, it is not limited to the capacitor and any battery can be used if it is rechargeable. The electric power accumulator 19 is connected to the DC bus 110, which is a constant voltage power accumulating part, through an up-down converter 58.

An inverter 22 is connected to the DC bus 110 of the electric power accumulating means 30. The inverter 22 controls the drive of the turning motor generator 21 to drive the turning mechanism 2. Thereby, when at least one of the motor generator 12 and the turning motor generator 21 is performing a power running operation, the electric power accumulating means 30 can supply an electric power necessary for the power running operation. On the other hand, when at least one of them is performing a generating operation or a regenerative operation, the electric power accumulating means 30 serves as a power source for accumulating electric power generated by the generating operation or the regenerative operation.

The electric power accumulating means 30 is provided with a voltage sensor 23, which is a voltage detector to detect a voltage of the DC bus 110. The voltage of the DC bus 110 is controlled by the converter 20. Additionally, a relay is connected between the converter 20 and the electric power accumulator 19 so that the connection between the converter 20 and the electric power accumulator 19 can be cut off. When the electric power accumulator 19 is disconnected by the relay, the voltage of the DC bus 110 of the electric power accumulating means 30 is not a voltage across the terminals of the electric power accumulator 19 but a voltage supplied by the inverters 18 and 22.

In the above-mentioned hybrid-type shovel, the motor generator 12 is a permanent magnet motor, and, thus, if a reduction in the magnetic force of the permanent magnet occurs (degaussing) during use, the motor generator 12 cannot provide a desired output. Thus, according to an embodiment of the present invention, degaussing of the motor generator is detected by detecting an induced voltage of the motor generator 12 when starting the engine 11. If the degaussing of the motor generator 12 is large, a caution or an alarm is issued to a driver or maintenance such that a replacement of the motor generator 12 is caused to be taken.

Figure 4:
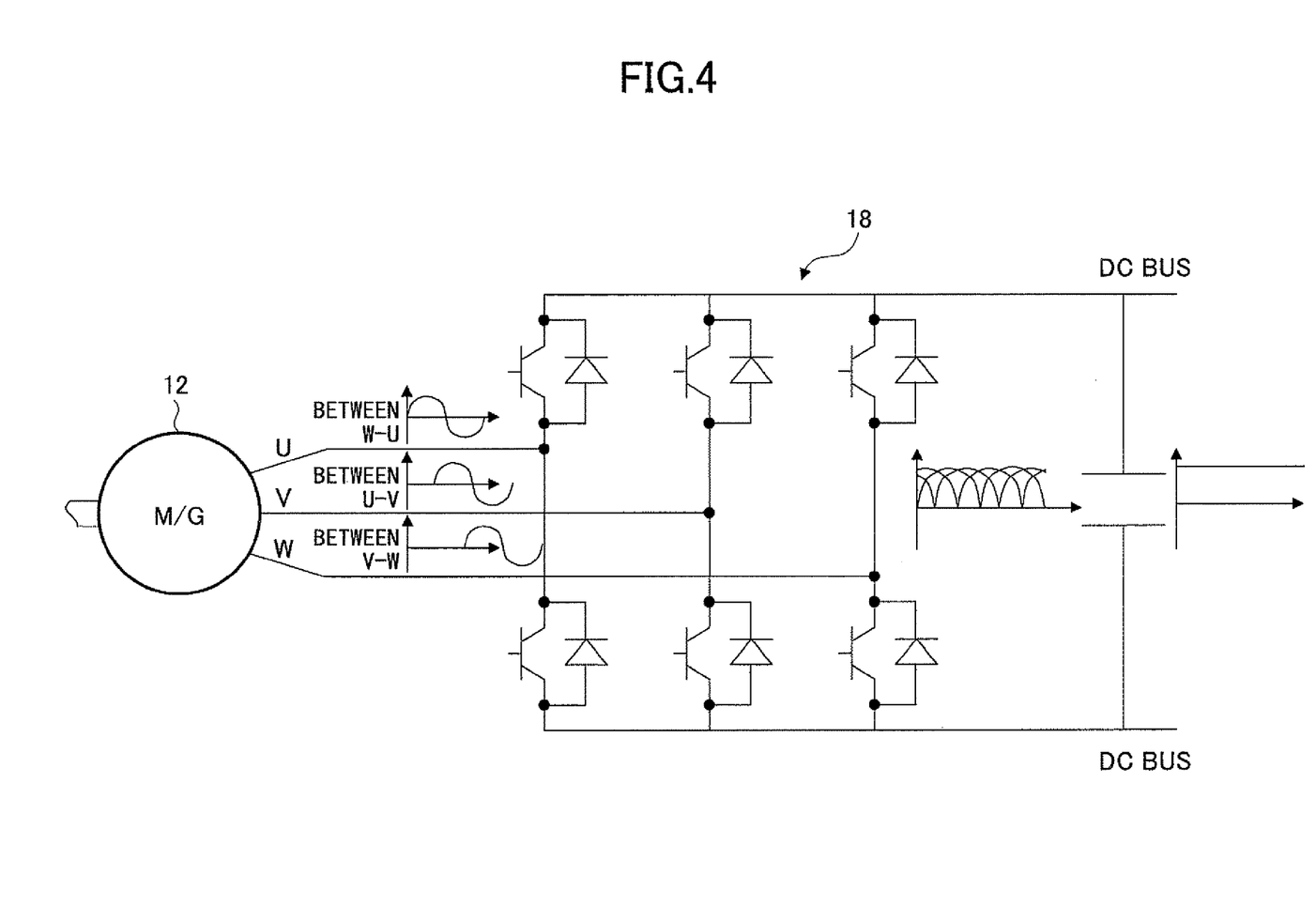
FIG. 4 is a diagram for explaining a method of supplying an induced voltage output by a motor generator by converting it into a DC bus voltage by an inverter.

Next, a description will be given of a method of detecting degaussing of the motor generator 12, which is performed in the above-mentioned hybrid-type shovel. The motor generator 12 is a motor driven by three-phase alternating-current voltage, and when functioning as a generator, three-phase alternating-current voltage is output from the motor generator 12. FIG. 4 is a diagram for explaining a method of supplying an induced voltage output from the motor generator 12 to the electric power accumulating means 30 by converting it into a DC bus voltage by the inverter 18.

When the motor generator 12 is rotated by the output of the engine 11, alternating voltages are generated in U-phase, V-phase and W-phase of the motor generator 12. The alternating voltages between W and U, between U and V and between V and W are sinusoidal alternating voltage of which phases differ by 120 degrees from each other. The three alternating voltages can be converted into a single direct-current voltage by inverting and synthesizing a negative component of each of the three alternating voltages by the inverter 18. Because peak values of the alternating voltages remain in this direct-current voltage and the direct-current voltage has a slightly wavy voltage waveform, the peaks are flattened by a smoothing capacitor. Thereby, a direct-current voltage having a level almost equal to the peak value of the alternating voltages between W and U, U and V, and V and W. The direct-current voltage is supplied from the inverter 18 to the DC bus of the electric power accumulating means 30.

Figure 5:
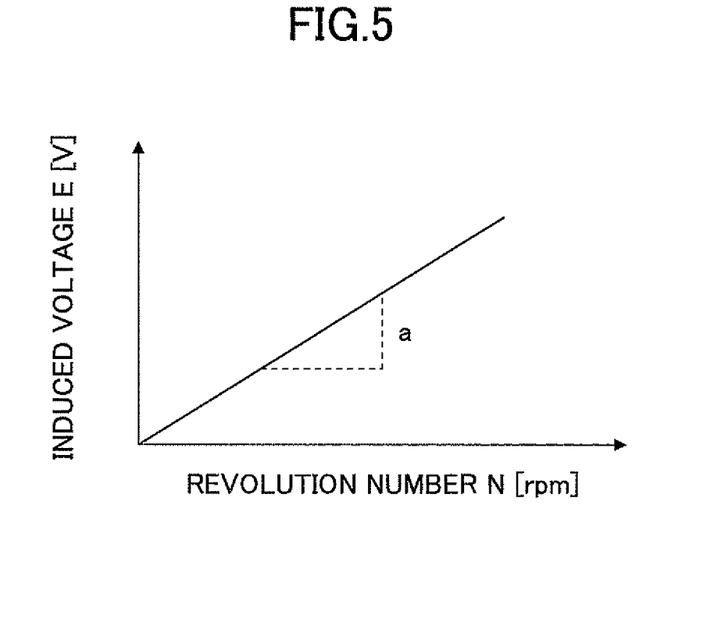
FIG. 5 is a graph indicating a relationship between a number of revolutions of the motor generator and an induced voltage generated.

Here, the induced voltage of the motor generator 12 is proportional to the number of revolution of the motor generator 12. FIG. 5 is a graph indicating a relationship between the revolution number N [rpm] of the motor generator 12 and the induced voltage E [V] generated by the motor generator 12. The induced voltage E generated by the motor generator 12 is proportional to the revolution number N of the motor generator 12, and the induced voltage E goes up linearly as the revolution number N goes up. The induced voltage E generated when the motor generator 12 is driven in a mint condition can be calculated by multiplying the revolution number N by an induced voltage coefficient a corresponding to an inclination of the line illustrated in FIG. 5, wherein the induced voltage E in the graph of FIG. 5 is equal to a reference induced voltage RE generated when the motor generator 12 is driven in a mint condition or equal to a reference induced voltage RE set as a design specification value of the motor generator.

However, when degaussing occurs in the permanent magnet during use of the motor generator 12, the induced voltage E does not become equal to the reference induced voltage RE, but becomes smaller than the reference induced voltage RE. That is, if degaussing occurs in the motor generator 12, the output of the motor generator 12 decreases and the motor generator 12 cannot provide an output as a mint condition or as a design specification value.

In other words, when the induced voltage E generated when the motor generator 12 is driven at a certain revolution number N is smaller than the reference induced voltage RE which is acquired by multiplying the revolution number N by the induced voltage coefficient a, the output of the motor generator 12 is smaller than the output in a mint condition, and it can be judged that degaussing has occurred in the motor generator 12.

Here, if the reference induced voltage RE is defined by the peak voltage of the line induced voltage between U, V and W phases of the motor generator 12, the above-mentioned induced voltage coefficient a can be used without change. If the reference induced voltage RE is defined by an effective value, the reference induced voltage RE is changed by multiplying the reference induced voltage RE by $\sqrt{2}$ and, then, the judgment of degaussing is made by comparing with an actual induced voltage appearing at the DC bus. Although the DC voltage supplied to the DC bus is smoothed as mentioned above, it is almost equal to the peak value of the alternating voltage.

In addition, a design specification value may be used as the induced voltage coefficient a. Alternatively, a more accurate induced voltage coefficient a can be set by acquiring the induced voltage coefficient a from a relationship between a revolution number and an induced voltage by driving the motor generator 12 in a mint condition.

A description is given below of a degaussing check method for determining degaussing of the motor generator 12.

Figure 6:
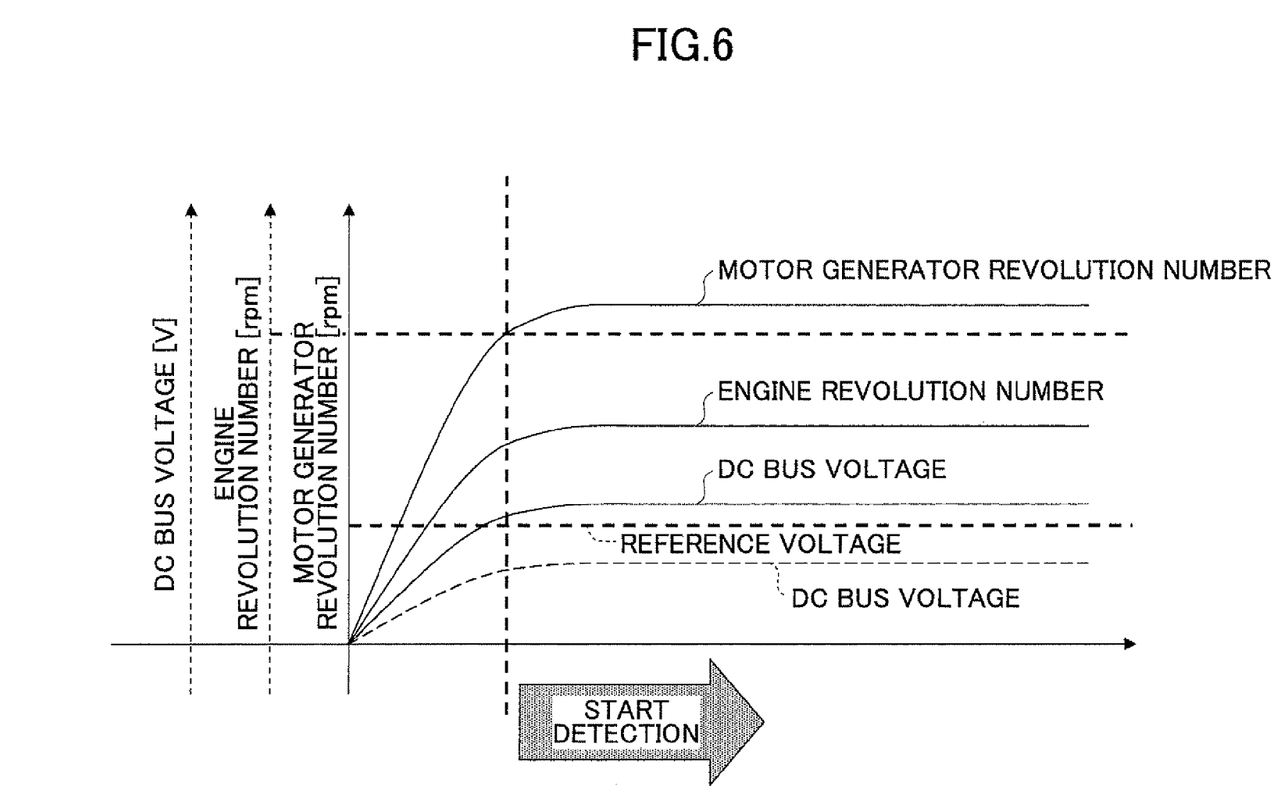
FIG. 6 is a graph indicating changes in a number of revolutions of an engine and a number of revolutions of the motor generator and a change in a DC bus voltage.

First, after starting the engine 11 by operating the ignition key and detecting a revolution number of the motor generator 12 by resolver 12A, it is determined whether the revolution number of the motor generator 12 reaches a previously set high revolution number. After the engine 11 is started, the revolution number of the motor generator 12 increases in proportion to an increase in the revolution number of the engine 11 to a fixed value. As illustrated in FIG. 6, the revolution number N of the motor generator 12 goes up as the revolution number of the engine 11 goes up, and as a result the induced voltage E goes up and the DC bus voltage also goes up. The value of the induced voltage is low while the revolution number of the motor generator 12 is low. If the induced voltage E (that is, a DC bus voltage RCV) is measured in a state where the value of the induced voltage E is low, a measurement error tends to be relatively large. Additionally, if the revolution number N is measured while the revolution number N of the motor generator 12 is increasing and fluctuating, it is anticipated that an error caused by the fluctuation is contained in the measured induced voltage E. It should be noted that changes in the DC bus voltage when degaussing has occurred is indicated by a dashed line in FIG. 6.

In the present embodiment, the degaussing check is started after the number of revolutions of the engine 11 goes up to some extent to be close to a fixed revolution number and the number of revolutions of the motor generator 12 also goes up and becomes stable. The degaussing check may be started after a predetermined time has passed after the engine 11 is started because the revolution number of the engine 11 is previously set to be constant. Alternatively, a value of the revolution number at which it can be judged that the revolution number of the motor generator 12 is stabilized may be determined, and the degaussing check may be started when the revolution number detected by the resolver 12A becomes equal to or larger than the revolution number concerned.

When the degaussing check is started, first, the revolution number N of the motor generator 12 is detected by the resolver 12A. Then, a reference induced voltage RE is acquired by multiplying the detected revolution number N by the previously determined induced voltage a (RE=N×a).

The voltage of the DC bus is detected by the voltage detector 23 simultaneously with the detection of the revolution number N of the motor generator 12. At this time, because the engine 11 is being started, the electric power accumulator 19 is disconnected from the converter 20. Therefore, the voltage appearing on the DC bus is not a voltage of the electric power accumulator 19 but the induced voltage E of the motor generator 12.

Moreover, if the inverter 22 is connected to the DC bus to drive the turning mechanism 2 by the turning motor generator 21, the mechanical brake provided to the turning mechanism 2 must be actuated. This is because, if braking is not applied to the turning mechanism 2, a regenerative electric power may be generated by the turning motor generator 21 when the upper-part turning body 3 is turned for some reasons. That is, it is prevented from being set in a state where if a regenerative electric power is generated by the tuning motor generator 21, the regenerative electric power is supplied to the DC bus through the inverter 22 and only the induced voltage E of the motor generator 12 cannot be detected at the DC bus. Here, the inverter 22 supplies an electric current to the turning motor generator 21 based on a lever operation of the operator. Therefore, the turning motor generator 21 is prevented from being supplied with an electric power due to the voltage accumulated in the DC bus because the lever operation is not performed when a starting operation of the engine 11 is initiated.

Next, the reference induced voltage RE acquired as mentioned above and the voltage DCV of the DC bus detected by the voltage detector 23 are compared. If the voltage DCV of the DC bus is equal to the reference induced voltage RE (DCV=RE), the motor generator 12 is generating the same output as that of a mint condition, and it can be judged that degaussing has not occurred.

On the other hand, if the voltage DCV of the DC bus is smaller than the reference induced voltage RE (DCV<RE), the output of the motor generator 12 is smaller than that of the mint condition, and it is judged that degaussing has occurred. A threshold value T of the judgment may be determined previously, and it can be judged that degaussing has occurred when the voltage DCV is smaller than the threshold value T (DCV<T). The threshold value T can be a value which is the reference induced voltage RE multiplied by a judgment rate k [%]. That is, it can be judged that degaussing has occurred if the voltage DCV of the DC bus is smaller than the threshold value T, which is acquired by multiplying the reference induced voltage RE by the judgment rate k [%] (DCV<T=RE×k).

If it is judged that degaussing has occurred in the motor generator 12, for example, a caution or warning may be issued so as to notify a driver of that matter. Thereby, the driver can recognize that the assist power by the motor generator 12 is reduced and can reflect it in the drive operation. Alternatively, a maintenance work such as a replacement of the motor generator with a new one may be performed.

In addition, it is desirable that the above-mentioned degaussing check is not performed immediately after stopping the drive of the engine 11. This is, because the DC bus voltage cannot become zero immediately after the drive of the engine 11 is stopped because there is a discharge from the smoothing capacitor provided in the DC bus. Accordingly, it is necessary to restrict execution of the degaussing check by a timer or the like during a period from a time when the drive of the engine 11 is stopped until a time when a discharge from the smoothing capacitor is ended.

As mentioned above, the hybrid-type shovel according to the present embodiment includes: the engine 11; the hydraulic pump 14 driven by an output of the engine 11; the boom cylinder 7 and the arm cylinder 8 that are driven by hydraulic pressure supplied from the hydraulic pump 14; the motor generator 12 coupled to the engine 11 and generating electric power by revolution of the engine 11; the electric power accumulating means 30 that supplies electric power to the motor generator 20; and the turning motor generator 21 connected to the electric power accumulating means 30 via the inverter 18 to drive the turning mechanism 2. The electric power accumulating means 30 includes a DC bus 110 connected to an electric power accumulator 19 and supplies a direct current, a smoothing capacitor provided to the DC bus 110, and the voltage detector 23 that detects a voltage of the DC bus 110. The motor generator 12 generates an induced voltage by being rotationally driven by the engine 11 when starting the engine 11. Degaussing of a permanent magnet of the motor generator 12 is determined by performing a comparison between the induced voltage DCV detected by the voltage detector 23 and the previously set reference induced voltage RE.

Although degaussing of the permanent magnet of the motor generator 12 is checked in the above-mentioned embodiment, degaussing of motors other than the motor generator 12 may be checked. As a motor of which degaussing should be checked, there is, for example, a boom regenerative motor.

Figure 7:
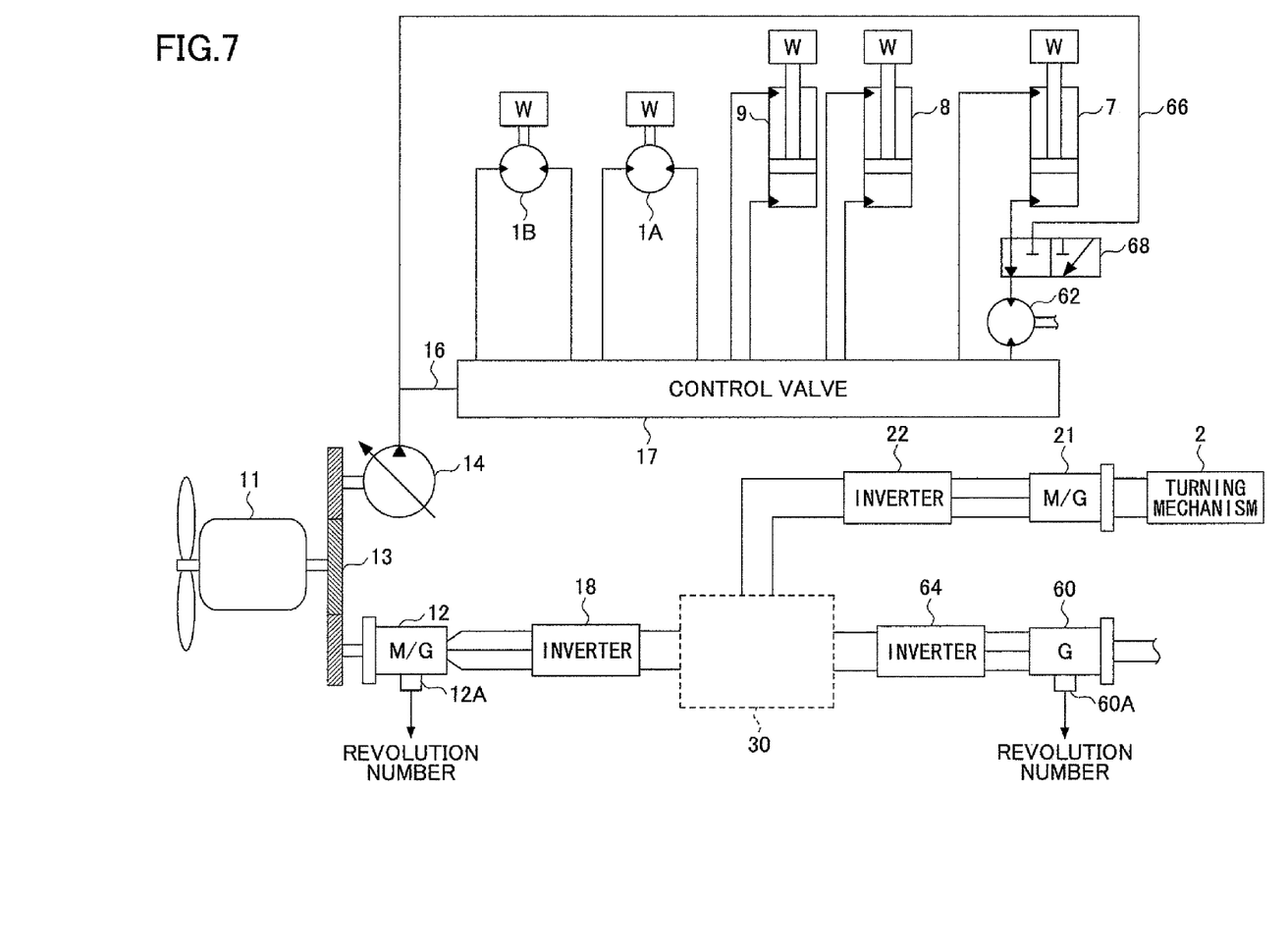
FIG. 7 is a block diagram representing a structure of a drive system of a hybrid-type shovel provided with a boom regenerative motor.

FIG. 7 is a block diagram illustrating a structure of a drive system of the hybrid-type shovel provided with a boom regenerative motor. The boom regenerative motor 60 as a motor having a generating function is connected to a boom regenerative hydraulic motor 62, and generates electric power by being driven by the boom regenerative hydraulic motor 62. The boom regenerative hydraulic motor 62 is arranged between the boom cylinder 7 and the control valve 17, and is driven by a work oil returning from the boom cylinder 7 to the control valve 17. Accordingly, the hydraulic energy of the work oil, which returns from the boom cylinder 7 to the control valve 17, is converted into electric energy. Thereby, the potential energy of the boom can be recovered as regenerative electric power. The electric power which the boom regenerative motor 60 generated is supplied to the electric power accumulating means 30 through the inverter 64, and is accumulated in the electric power accumulating part or used to drive other electric loads.

As mentioned above, in order to check degaussing of the permanent magnet of the motor generator 12, it is necessary to detect the induced voltage E generated by the motor generator 12 when the motor generator 12 is rotating at a known number of revolutions. Also when checking degaussing of the boom regenerative motor 60, it is necessary to detect the induced voltage E when the boom regenerative motor 60 is rotating at a known number of revolutions. Thus, in the present embodiment, a bypass circuit 66 is provided between the hydraulic pump 14 and the boom regenerative motor 60. Thereby, the hydraulic pressure from the hydraulic pump 14 can be directly supplied to the boom regenerative motor 60 through the bypass circuit 66 to rotate the boom regenerative motor 60 at a fixed number of revolutions. The revolution number of the boom regenerative motor 60 can be detected by a resolver 20A attached to the boom regenerative motor 60.

A switching valve 68 is provided between the boom cylinder 7 and the boom regenerative hydraulic motor 62. When driving the boom cylinder 7, the switching valve 68 is switched so that work oil flows form the boom cylinder 7 to the boom regenerative hydraulic motor 62. On the other hand, when detecting the induced voltage E of the boom regenerative hydraulic motor 63, the switching valve 68 is switched so that the bypass circuit 66 is connected to the boom regenerative hydraulic motor 62. That is, when detecting the induced voltage E of the boom regenerative motor 60, the switching valve 68 is operated so that the work oil from the bypass circuit 66 bypasses the boom cylinder 7 and is supplied to the boom regenerative hydraulic motor 62. Thereby, the boom regenerative hydraulic motor 62 is caused to idle-run to drive the boom regenerative motor 60 by the rotation, and the induced voltage E at that time can be detected by the voltage detector 23.

Based on the induced voltage E of the boom regenerative motor 60 detected as mentioned above, the degaussing check can be performed in the same manner as the above-mentioned motor generator 12.

It should be noted that although the above-mentioned embodiment was explained with the parallel system hybrid-type shovel as an example, the present invention is not limited to the parallel system and applicable to a so-called series system hybrid-type shovel.

Figure 8:
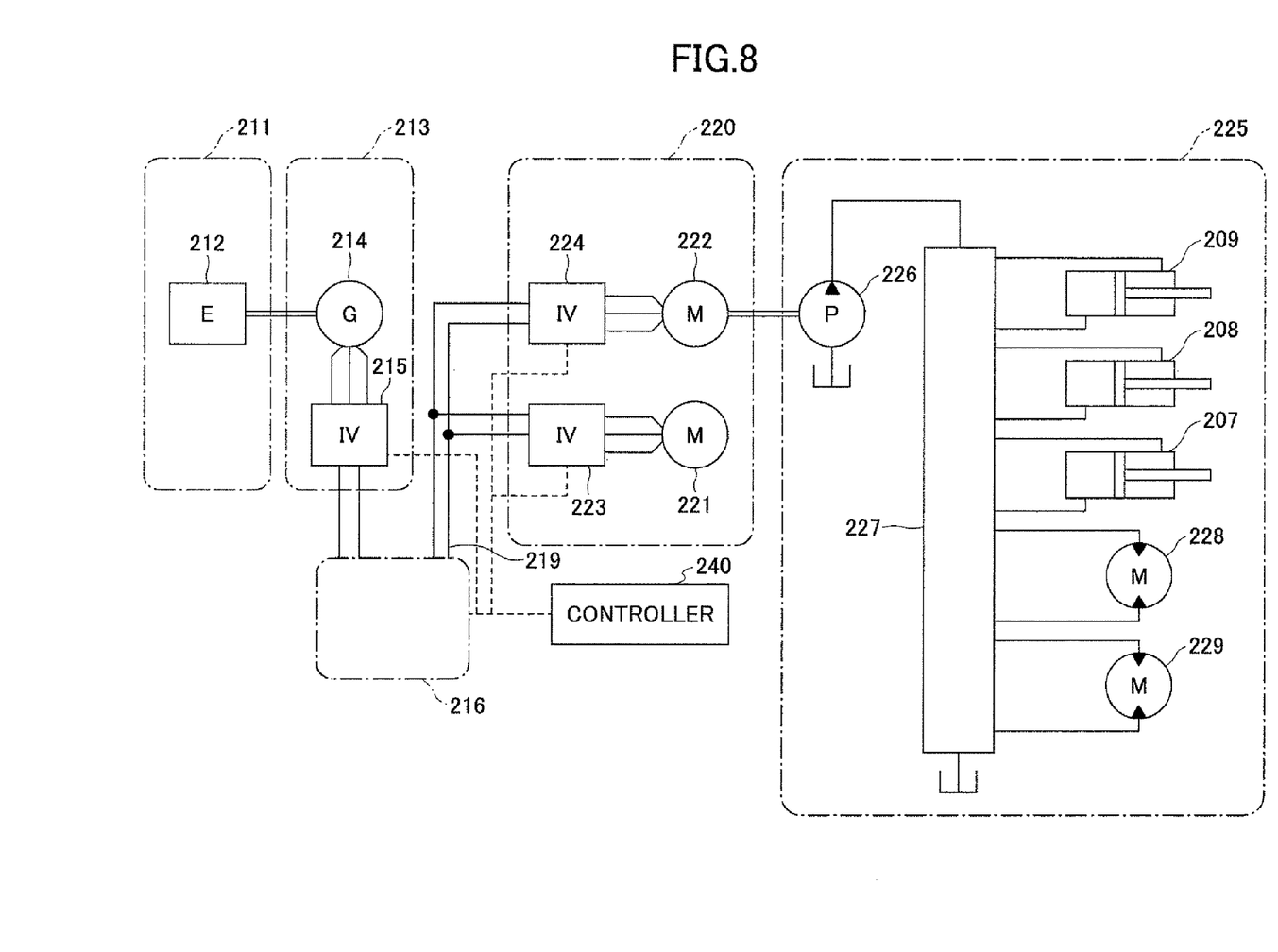
FIG. 8 is a block diagram indicating a structure of a hybrid-type shovel of a series system to which the present invention is applicable.

FIG. 8 is a block diagram illustrating a structure of a series system hybrid-type shovel to which the present invention is applicable. In FIG. 8, a mechanical power system is indicated by double lines, hydraulic lines are indicated by bold solid lines, an electric drive system is indicated by thin solid lines and an electric control system is indicated by dotted lines, respectively.

An engine 212 of a mechanical drive part 211 drives a generator 214 of a generating part 213. The electric power generated by the generator 214 is supplied to the an electric power accumulating part 216 through an inverter 215 of the generating part 213. The electric power supplied to the electric power accumulating part 216 is supplied to a battery (not illustrated in the figure) as an electric power accumulator. Thereby, the battery is charged. It should be noted that the electric power accumulating part 216 can be the same structure as the electric power accumulating means 30 illustrated in FIG. 3.

An electric load system 220, which is driven in response to an electric power supplied from a battery, is provided with a turning motor 221 and a pump drive motor 222. The turning motor 221 is a motor to drive a turning mechanism to turn an upper-part turning body. Electric power is supplied from a battery to the turning motor 221 through an inverter 223. Electric power is supplied also to the pump drive motor 222 from the battery through an inverter 224. The pump drive motor 222 is a motor to drive a hydraulic pump 226 of a hydraulic load system 225. Hydraulic pressure generated by the hydraulic pump 226 is supplied to each of the bucket cylinder 209, the arm cylinder 208, the boom cylinder 207, the running (right) hydraulic motor 228, and the running (left) hydraulic motor 229 through a control valve 227. The bucket cylinder 209 is a hydraulic cylinder to drive a bucket. The arm cylinder 208 is a hydraulic cylinder to drive an arm. The boom cylinder 207 is a hydraulic cylinder to drive a boom.

It should be noted that the running (right) hydraulic motor 228 is a hydraulic motor to drive a crawler on the right-hand side of a lower-part running body, and the running (left) hydraulic motor 229 is a hydraulic motor to drive a crawler on the left-hand side of the lower-part running body.

It should be noted that although an electric power accumulator such as a electric double-layer capacitor is used as a battery, it is not limited to this and other rechargeable electric power accumulator may be used. The electric power accumulator has an advantage that a state of charge SOC can be easily acquired from a terminal voltage. It should be noted that a voltage detector (not illustrated in the figure) to detect the terminal voltage of the battery is connected to the terminals of the battery.

A controller 240 controls an inverter 215, 223 and 224 and a converter (not illustrated in the figure) to control an electric power supply from the generator 240 to the battery (an amount of charge of the battery) and from the battery to the electric load system 220 (an amount of discharge of the battery). Additionally, the controller 240 acquires a state of charge SOC of the battery based on the detected voltage from the voltage detector, and controls the output (an amount of charge and discharge) of the battery based on the acquired state of charge SOC.

The series system hybrid-type shovel of the above-mentioned structure includes: the engine 212; the generator 214 driven by an output of the engine 212; the boom cylinder 207 and the arm cylinder 208 that are driven by hydraulic pressure supplied from the hydraulic pump 226 driven by electric power from the electric power accumulator 216; and the tuning motor generator 221 connected to the electric power accumulator 216 through the inverter 223 to drive the turning mechanism. The electric power accumulator 216 includes a DC bus connected to an electric power accumulator and supplies a direct current, a smoothing capacitor provided to the DC bus 110, and the voltage detector that detects a voltage of the DC bus. The generator 214 generates an induced voltage by being rotationally driven by the engine 212 when starting the engine 212. Degaussing of a permanent magnet of the generator 214 is determined by performing a comparison between the induced voltage DCV detected by the voltage detector and the previously set reference induced voltage RE.

The present invention is not limited to the specifically disclosed embodiments, and various variations and modifications may be made without departing from the scope of the present invention.

The present application is based on priority claimed Japanese Patent Application No. 2009-035780 filed on Feb. 18, 2009, the entire contents of which are incorporated herein by reference.

INDUSTRIAL APPLICABILITY

The present invention is applicable to a hybrid-type shovel in which an engine is assisted by a generator.

EXPLANATION OF REFERENCE NUMERALS 1 lower-part running body
1A, 1B running mechanism
2 turning mechanism
3 upper-part turning body
4 boom
5 arm
6 bucket
7 boom cylinder
8 arm cylinder
9 bucket cylinder
10 cabin
11 engine
12 motor generator
12A resolver
13 transmission machine
14 hydraulic pump
16 high-pressure hydraulic line
17 control valve
18 inverter
19 electric power accumulator
20 inverter
21 turning electric motor
22 inverter
23 voltage detector
30 electric power accumulating means
58 converter
60 boom regenerative motor
62 boom regenerative hydraulic motor
64 inverter
66 bypass circuit
68 switching valve
110 DC bus
211 mechanical drive part
212 engine
213 generating part
214 generator
215, 223, 224 inverter
216 electric power accumulating part
219 DC bus
220 electric load system
221 turning motor 222 pump drive motor
225 hydraulic load system
226 hydraulic pump
227 control valve
228 running (right) hydraulic motor
229 running (left) hydraulic motor
240 controller

The invention claimed is:

1. A hybrid-type shovel comprising:
an engine;
a hydraulic pump driven by an output of the engine;
a boom drive hydraulic cylinder and an arm drive hydraulic cylinder that are driven by hydraulic pressure supplied from the hydraulic pump;
a generator coupled to the engine and generating electric power by revolution of said engine;
an electric power accumulating means that supplies electric power to the generator; and a turning motor connected to said electric power accumulating means via an inverter to drive a turning mechanism, wherein said electric power accumulating means includes a DC bus connected to an electric power accumulator and supplies a direct current, a smoothing capacitor provided to the DC bus, and a voltage detector that detects a voltage of the DC bus;
said generator generates an induced voltage by being rotationally driven by said engine when starting said engine;
and a means for determining degaussing of a permanent magnet of said generator by performing a comparison between the induced voltage detected by said voltage detector and a previously set reference induced voltage.

2. The hybrid-type shovel as claimed in claim 1, wherein said voltage detector is attached to said DC bus.

3. The hybrid-type shovel as claimed in claim 1, wherein, when detecting the induced voltage of said generator to perform said comparison, braking is applied mechanically to said turning drive part to be maintained in a stopped state.

4. The hybrid-type shovel as claimed in claim 1, wherein when detecting the induced voltage of said generator to perform said comparison at a start time of said engine, said DC bus and said electric power accumulator are set in a non-connected state.

5. The hybrid-type shovel as claimed in claim 1, wherein said generator is mechanically coupled to said engine.

6. The hybrid-type shovel as claimed in claim 1, wherein said generator is driven by a boom regenerative hydraulic motor.

7. The hybrid-type shovel as claimed in claim 6, comprising a bypass circuit that connects said hydraulic pump and said boom regenerative hydraulic motor.

* * * * *